United States Patent [19]

Kaneko et al.

[11] Patent Number: 4,750,051
[45] Date of Patent: Jun. 7, 1988

[54] COLOR DIFFERENCE LINE SEQUENTIAL CIRCUIT IN A MAGNETIC RECORDING SYSTEM

[75] Inventors: Kiyotaka Kaneko; Ikuhisa Sekizawa, both of Tokyo, Japan

[73] Assignee: Fuji Photo Film Co., Ltd., Kanagawa, Japan

[21] Appl. No.: 917,213

[22] Filed: Oct. 9, 1986

[30] Foreign Application Priority Data

Oct. 14, 1985 [JP] Japan .................. 60-228197

[51] Int. Cl.$^4$ .............................................. H04N 9/79
[52] U.S. Cl. ..................................... 358/330; 358/14; 358/34
[58] Field of Search .................. 358/310, 315–318, 358/330, 12, 14, 15–18, 34

[56] References Cited

U.S. PATENT DOCUMENTS

| | | | |
|---|---|---|---|
| 3,717,725 | 2/1973 | Numakura | 358/330 X |
| 4,183,050 | 1/1980 | Tsuchiya et al. | 358/34 |
| 4,617,590 | 10/1986 | Dann | 358/34 |
| 4,654,726 | 3/1987 | Kluth | 358/330 X |

Primary Examiner—W. B. Perkey
Attorney, Agent, or Firm—Parkhurst & Oliff

[57] ABSTRACT

A color difference line sequential circuit for use in a magnetic recording apparatus such as an electronic still camera or the like in which an image signal is frequency modulated and is then recorded in a magnetic recording medium. The color difference line sequential circuit can eliminate the effects of a clamping operation performed when a color difference signal is line sequentialized.

In the color difference line sequential circuit, when the color difference signals are line sequentialized in a recording system, the direct current levels of color difference signals R-Y, B-Y during the blanking periods thereof are clamped by two kinds of clamp pulses output every 2 H and different 180° from each other in phase, respectively, and one of the two color difference signals that is not clamped is selectively taken in and line sequentialized by a select signal created based on the above two clamp pulses, whereby it is possible to prevent the deterioration of the quality of reproduced pictures due to a clamping operation in recording.

5 Claims, 6 Drawing Sheets

F I G. 1
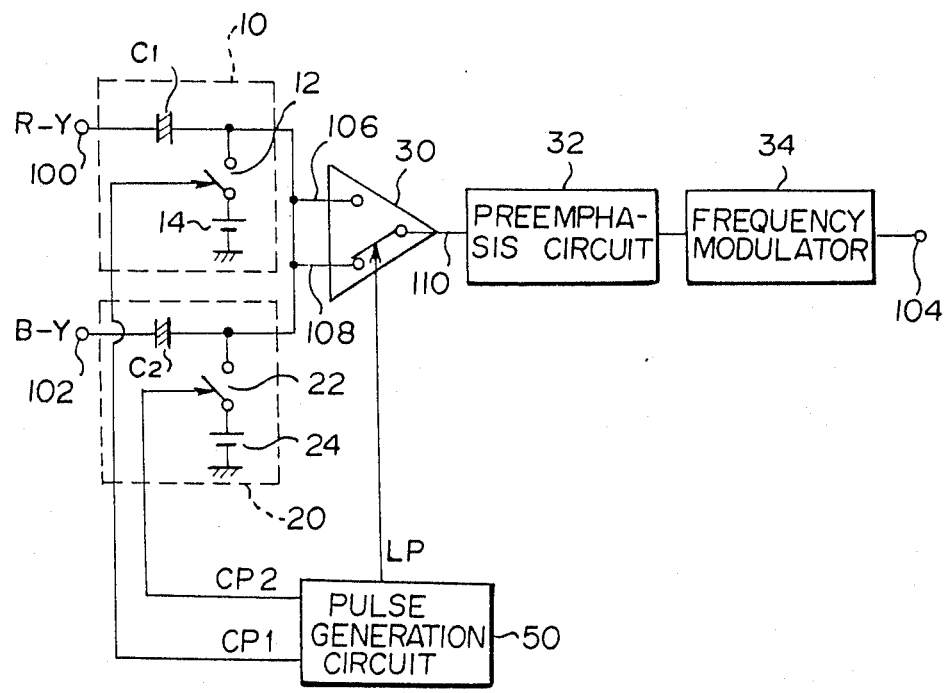

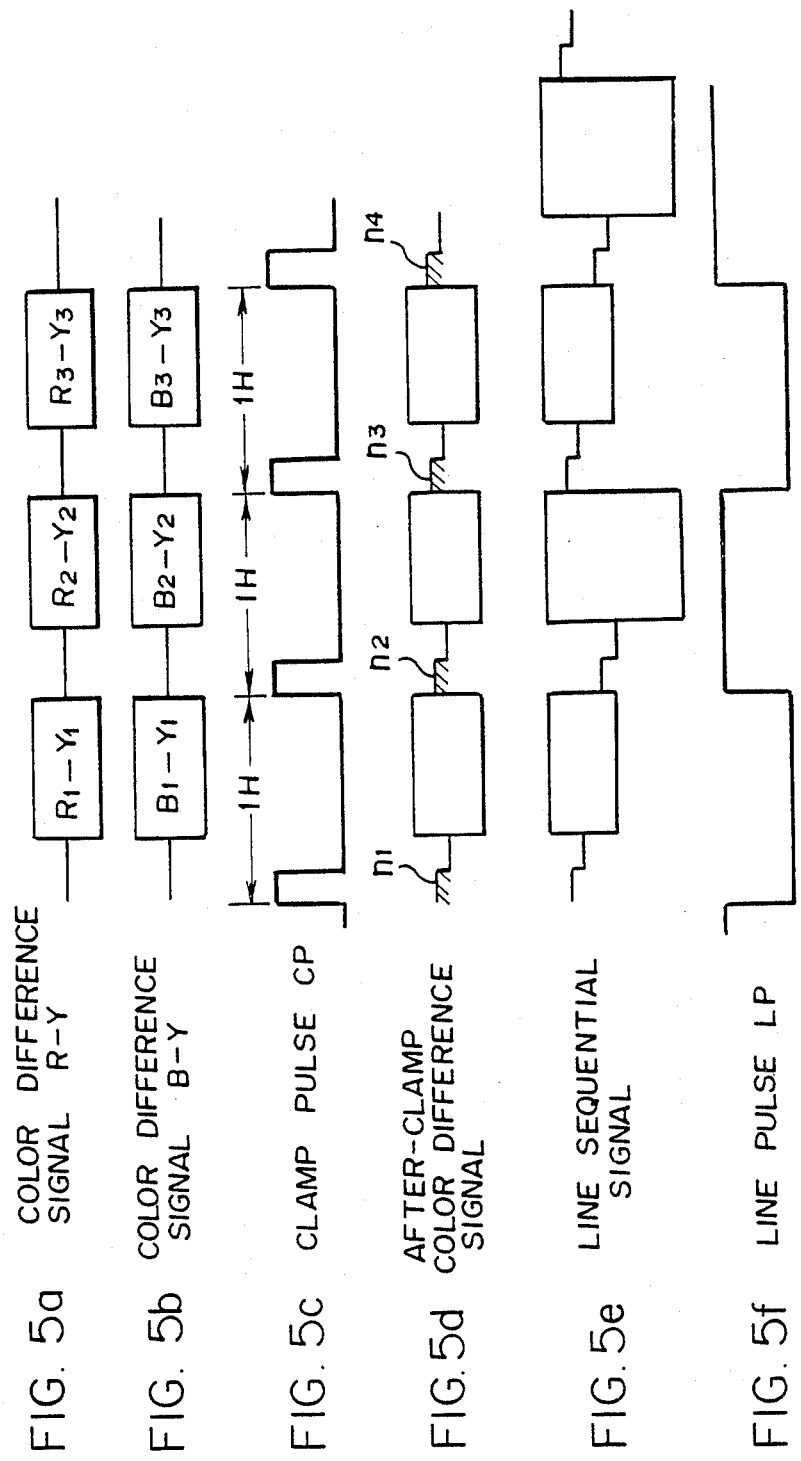
FIG. 5a COLOR DIFFERENCE SIGNAL R-Y
FIG. 5b COLOR DIFFERENCE SIGNAL B-Y
FIG. 5c CLAMP PULSE CP
FIG. 5d AFTER-CLAMP COLOR DIFFERENCE SIGNAL
FIG. 5e LINE SEQUENTIAL SIGNAL
FIG. 5f LINE PULSE LP

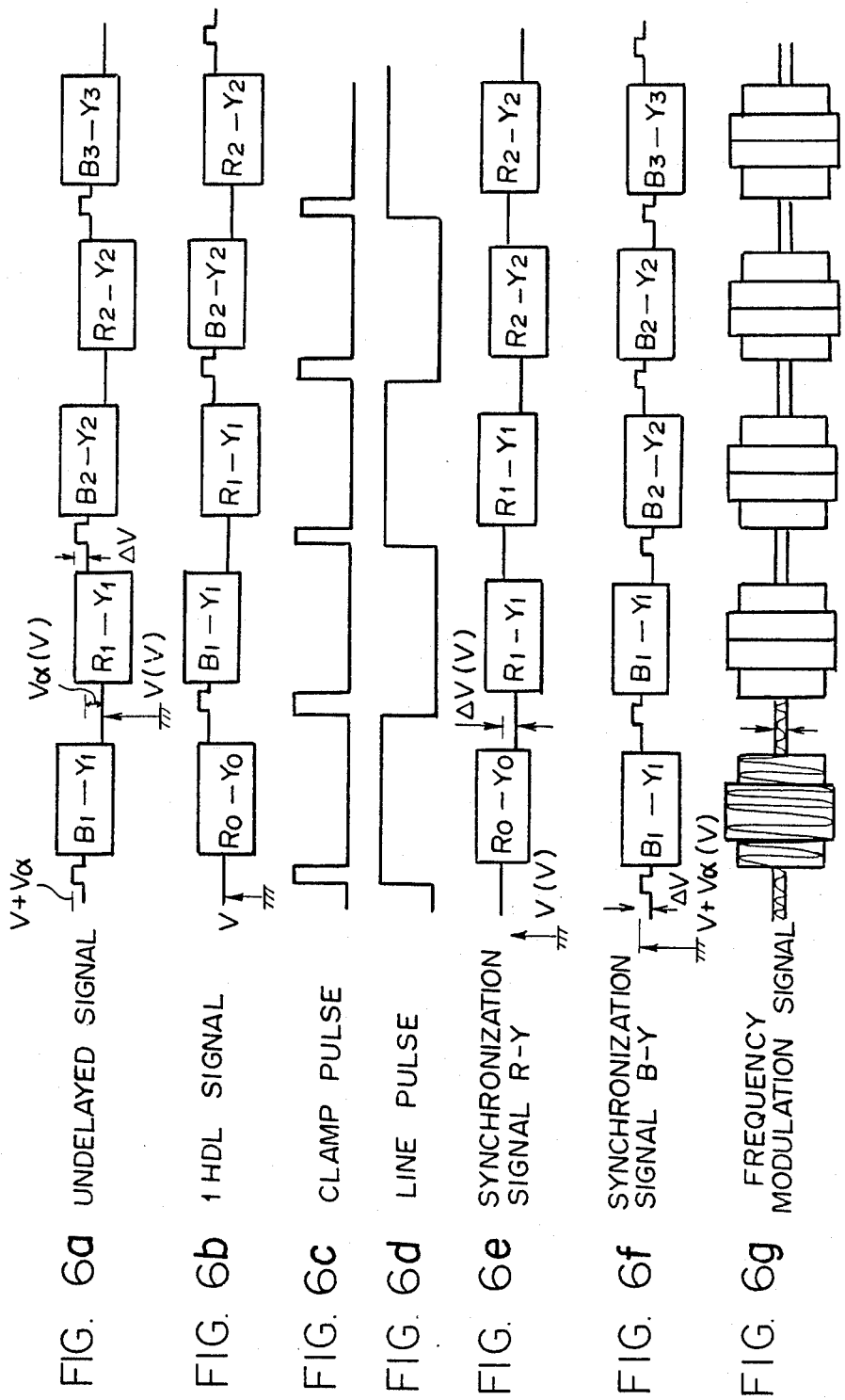

COLOR DIFFERENCE LINE SEQUENTIAL CIRCUIT IN A MAGNETIC RECORDING SYSTEM

BACKGROUND OF THE INVENTION

1. Field of the Invention

The present invention relates to a color difference line sequential circuit used in a magnetic recording system and, in particular, to a color difference line sequential ciruit which eliminates the effects of a clamping operation peformed when a color difference signal is line sequentialized in a recording system.

2. Description of the Prior Art

In a conventional color difference line sequential circuit employed in a recording system of a magnetic record/reproduction system in an electronic still camera or the like in which an image signal is frequency modulated and recorded in a magnetic recording medium and the recorded signal is then reproduced and displayed on the screen of a display device, there is a problem that effects resulting from a clamp operation performed in line sequentializing a color difference signal destroy a color balance in a reproduction system to deteriorate the quality of the image displayed on the screen. This problem will discussed below in connection with FIGS. 3 through 6. In FIG. 3, there is shown a general construction of a color difference line sequential circuit in a recording system of a conventional magnetic recording/reproducing system, and, in FIG. 4, there is shown a general construction of a color difference line sequential synchronization circuit in a reproducing system thereof. In FIG. 3, there are provided clamp circuits 10, 20 which are adapted to clamp the direct current levels during the blanking periods of color difference signals R-Y, B-Y which are input from terminals 100, 102, respectively. Clamp Circuit 10 comprises a capacitor C1, a switch 12, and a d.c. supply 14,while Clamp Circuit 20 comprises a capacitor C2, a switch 22, and a d.c. supply 24. These switches 12, 22 are analog switches, each of which is operated by a clamp pulse CP output for each horizontal scan period (1 H) from a pulse generation circuit 52. Also, there is provided a synchronization switch 30 is an analog switch which is adapted to take in and synchronize alternately and selectively for 1 H the color difference signals R-Y, B-Y respectively output from Clamp Circuits 10, 20, and this switch 30 is operable by a line pulse LP output from Pulse Generation Circuit 52. Referring further to FIG. 3, numeral 32 designates a pre-emphasis circuit, and 34 represents a frequency modulator.

In the above-mentioned color difference line sequential synchronization circuit in the reproduction system, as shown in FIG. 4, a line sequential color difference signal C input from a terminal 106 is divided into two signals: that is, an undelayed signal which is passed as it is, or, undelayed through an amplifier 60 and a clamp circuit 110 and is output to a synchronization switch 74; and, a delayed signal which is delayed by 1 H through 1 H delay line 62, is then passed through an amplifier 64 and a clamp circuit 120, and is output to to a synchronization switch 76. Clamp Circuit 110 comprises a capacitor C3, an analog switch 66 operable by Clamp Pulse CP, and a d.c. supply 70, while Clamp Circuit 120 comprises a capacitor C4, an analog switch 68 operable by Clamp Pulse CP, and a d.c. supply 72. In FIG. 4, reference numeral 78 denotes a color encoder which takes in the color difference signals R-Y, B-Y divided by Synchronization Switches 74, 76 operable by Line Pulse LP and converts the color difference signals into an NTSC signal 80.

In the above-mentioned construction, the color difference signals R-Y, B-Y are input at timings shown by (a), (b) in FIG. 5 to the terminals 100, 102 of the color difference line sequential circuit in the recording system, respectively, and the levels of direct current during the blanking periods of these color difference signals are clamped by Analog Switches 12, 22 operable by Clamp Pulse CP (FIG. 5(c)) which is output every 1 H, (FIG. 5(d)). During this clamping operation, since only a portion of the direct current levels in the blanking periods of the color difference signals is clamped to a given potential which is determined by D.C. Supplies 14, 24, there is produced a phenomenon (in this embodiment, for convenience' sake, this is referred to as a clamp disfigurement.) that a portion of Clamp Pulse CP is superposed on the d.c. level in the blanking period of the color difference signal (R-Y or B-Y) to be clamped, (see portions n1~n4 shown by oblique lines in FIG. 5(d)). Then, the color difference signals R-Y, B-Y affected by such clamp pulse CP are line sequentialized at timings of the line pulse (FIG. 5(f)), (see FIG. 5(e)).

On the other hand, in the reproducing system, the undelayed signal (FIG. 6(a)) of the line sequential color difference signal C input from the terminal 106 is input to Clamp Circuit 110 via Amplifier 60, while the 1 H delayed signal (FIG. 6(b)) obtained via 1 H Delay Line 62 is input to Clamp Circuit 120 via Amplifier 64. Here, after the line sequential color difference signal is synchronized, in order that the offset amounts of the d.c. levels of the line sequential color difference signal corresponding to the blanking periods of the undelayed and 1 H delayed signals before the line sequential color difference signal is synchronized are made to be equal to each other, the supply voltage of the d. c. supply 72 in Clamp Circuit 120 is regulated to thereby make the clamp levels in the blanking periods of the color difference signal be equal to each other in the undelayed signal and the 1 H delayed signal thereof.

However, in the before-described conventional system, there is left the clamp disfigurement in recording (FIG. 6(a), (b)). As a result of this, if such line sequential color difference signal is clamped by Analog Switch 66, 68 at the timing of the clamp pulse CP (FIG. 6(c)), then the clamp disfigurement portion in the blanking period of the line sequential color difference signal is clamped. In other words, if a voltage applied to the base line of the clamp disfigurement portion is expressed by $\Delta V$, an offset error of the direct current level corresponding to $\Delta V$ appears on the color difference signal synchronized by synchronization switches 74, 76 operable by the line pulse (FIG. 6(d)), (see FIG. 6(e), (f)). Thus, the color difference signal having such offset error is, as it is, modulated by a color encoder 78, (FIG. 6(g)), resulting in the color blurs in the color signal.

As mentioned above, in the recording system in the conventional magnetic recording/reproducing system, there is a problem that the color blurrs are produced due to the clamp operation which is performed when the color difference signal is line sequentialized, resulting in the deteriorated quality of the picture.

SUMMARY OF THE INVENTION

The present invention aims at eliminating the drawbacks found in the above-described conventional circuits.

It is an object of the invention to provide a color difference line sequential circuit for use in a magnetic recording/reproducing system which eliminates an offset error in a color difference signal in a reproducing system thereof resulting from a clamp operation peformed when the color difference signal is line sequentialized in a recording system thereof, thereby avoiding color blurrs in a color signal.

In order to attain the above object, according to the invention, there is provided a color difference line sequential circuit for a magnetic recording system in which the direct levels of color difference signals R-Y, B-Y in the blanking periods thereof are clamped, the clamped color difference signals are taken in alternately and selectively at a given cycle to be line sequentialized, the line sequentialized color signal is frequency modulated and mixed with a frequency modulated brightness signal, and the mixed signal is supplied to a magnetic head, said color difference line sequential circuit comprising: first clamping means for clamping the direct current level of the color difference signal R-Y in the blanking period thereof; second clamping means for clamping the direct current level of the color difference signal B-Y in the blanking period thereof; signal switching means for selectively taking in the color difference signals clamped by the first and second clamping means to line sequentialize the same signals; and, pulse signal generating means for outputting pulse signals to the first and second clamping means respectively every 2 horizontal scan periods, that is, outputting two kinds of clamp pulses differing 180° from each other in phase and outputting to the signal switching means a pulse signal for selecting the unclamped one out of the above-mentioned color difference signals R-Y, B-Y.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 1 is a circuit diagram of an embodiment of a color difference line sequential circuit constructed in accordance with the present invention;

FIGS. 5a-5f are timing charts to show the operation of the color difference line sequential circuit shown in FIG. 3; and, FIGS. 6a-6g are timing charts to show the operation of the color difference line sequential synchonization circuit shown in FIG. 4.

DETAILED DESCRIPTION OF THE INVENTION

Detailed description will hereunder be given of a preferred embodiment of a color difference line sequential circuit according to the present invention with reference to the accompanying drawings.

Figure 3:
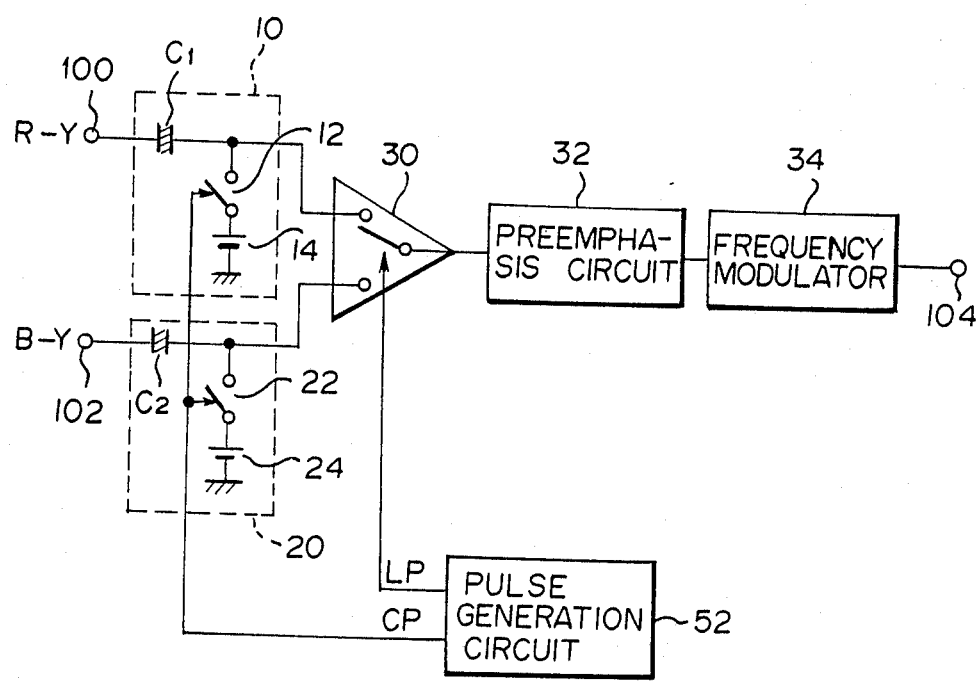
FIG. 3 is a circuit diagram to show a general structure of a color difference line sequential circuit constructed in accordance with the prior art.
Figure 4:
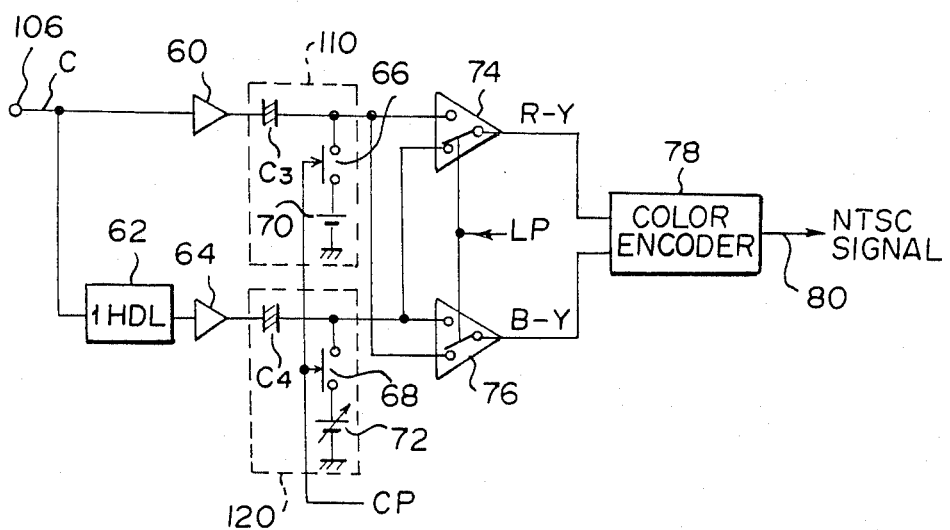
FIG. 4 is a circuit diagram to show a general structure of a color difference line sequential synchonization circuit in a reproducing system.

Specifically, in FIG. 1, there is shown a circuit diagram of an embodiment of a color difference line sequential circuit according to the invention. The present embodiment is different from the conventional color difference line sequential circuit shown in FIG. 3 in that there is provided a pulse generation circuit 50 which is adapted to output two kinds of clamp pulses CP1, CP2 as well as a line pulse: in particular, the two clamp pulses CP1 and CP2 are respectively output every two horizontal scan periods (2 H) and differ 180° from each other in phase; and, the line pulse LP rises in synchronization with the rising of the clamp pulse CP1 and falls in synchronization with the rising of the clamp pulse CP1. The structure of the present invention is quite identical with that of the above-mentioned prior art circuit except the provision of the pulse generation circuit 50, and thus the similar portions thereof are not explained again here to avoid duplicated explanation.

Figure 2:
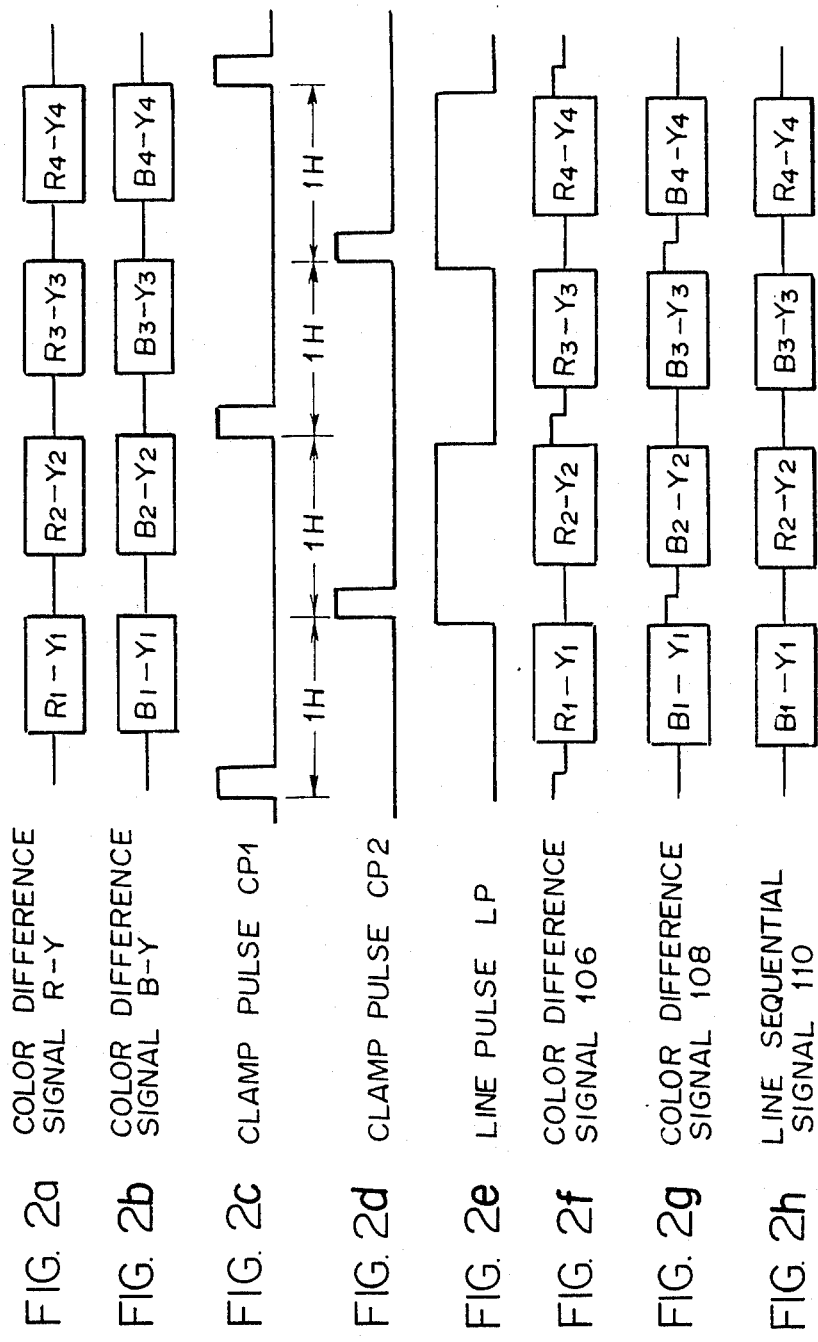
FIGS. 2a-2h are timing charts to show the operation of the color difference line sequential circuit shown in FIG. 1.

Referring now to the structure of the present embodiment, color difference signals R-Y, B-Y respectively coming from terminals 100, 102 are input to clamp circuits 10, 20, respectively, (FIG. 2(a), (b)). The color difference signals R-Y, B-Y are respectively clamped by analog switches 12, 22 which can be operated by the clamp pulses CP1, CP2 (FIG. 2(c), (d)) output every 2 H from Pulse Generation Circuit 50, respectively. As a result of this, as shown in FIG. 2 (f), (g), although there are left clamp disfigurements respectively in the direct current levels of the clamped color difference signals 106, 108 during the blanking periods thereof, the unclamped color difference signal (R-Y, or B-Y) is always selected alternately by a synchronization switch 30 which can be operated by the line pulse LP (FIG. 2(e)) output from Pulse Generation Circuit 50, so that there can be eliminated the effect of the clamping operation on the color difference signal 110, (FIG. 2(h)).

Therefore, according to the present embodiment, it is possible to solve the problem found in the prior art circuit that the above-mentioned clamping operation given rise to the color blurs of the pictures when they are reproduced, that is, the color balance is destroyed to deteriorate the quality of the pictures reproduced.

As described above, according to the present invention, when the color difference signal is line sequentialized in the recording system thereof, the levels of direct current of the color difference signals R-Y, B-Y during the blanking periods thereof are clamped by two kinds of clamping pulses which are output every 2 H and differ 180° from each other in phase, respectively, and the unclamped color difference signal is selectively taken in by a select signal (line pulse) created based on the above-mentioned two clamp pulses and is then line sequentialized, so that the deterioration of the picture quality the reproduced picture due to the clamp operation in recording can be prevented.

It should be understood, however, that there is no intention to limit the invention to the specific form disclosed, but on the contrary, the invention is to cover all modifications, alternate constructions and equivalents falling within the spirit and scope of the invention as expressed in the appended claims.

What is claimed is:

1. An improved color difference line sequential circuit for use in a magnetic recording apparatus in which the levels of direct current of color difference signals R-Y, B-Y during the respective blanking periods thereof are clamped, said clamped color difference signals are taken in and line sequentialized alternately and selectively at a given cycle, said line-sequentialized color difference signals are respectively frequency modulated and mixed with frequency modulated brightness signals, and said mixed signals are then supplied to a magnetic head, wherein the improvement comprising:

first means for clamping said direct current level of said color difference signal R-Y during the blanking period thereof;

second means for clamping said direct current level of said color difference signal B-Y during the blanking period thereof;

signal switching means for selectively taking in and line sequentializing said color difference signals respectively clamped by said first and second clamp means; and, pulse signal generation means for outputting to said first and second clamp means two kinds of clamp pulses which are respectively output every 2 horizontal scan periods and differ 180° from each other in phase, and for outputting to said signal switching means a pulse signal for selecting one of said color difference signals R-Y, B-Y which is not clamped.

2. An improved color difference line sequential circuit for use in a magnetic recording apparatus as set forth in claim 1, wherein said pulse signal output from said pulse signal generation means for selecting one of said color difference signals R-Y, B-Y which is not clamped is timed such that it rises in synchronization with the rising of one of said two kinds of clamp pulses respectively output to said first and second clamp means and falls in synchronization with the rising of the other clamp pulse.

3. An improved color difference line sequential circuit for use in a magnetic recording apparatus as set forth in claim 1, wherein each of said first and second clamp means comprises a direct current supply for supplying a direct current voltage when said color difference signal is clamped during the blanking period thereof, a capacitor interposed between said signal switching means and an input terminal to which said color difference signal is input for holding said direct current voltate, and switch means interposed between one end of said capacitor and said direct current supply and switchable or controllable by a clamp pulse output from said pulse signal generation means.

4. An improved color difference line sequential circuit for use in a magnetic recording apparatus as set forth in claim 3, wherein said switch means is an analog switch.

5. An improved color difference line sequential circuit for use in a magnetic recording apparatus as set forth in claim 1, wherein said signal switching means is an analog switch.

* * * * *